(12) United States Patent
Caillot et al.

(10) Patent No.: US 11,760,315 B2
(45) Date of Patent: Sep. 19, 2023

(54) MODULE FOR CLEANING AN OPTICAL ELEMENT OR A DEVICE FOR PROTECTING AN OPTICAL ELEMENT AND ASSOCIATED DRIVING ASSISTANCE SYSTEM

(71) Applicant: Valeo Systèmes d'Essuyage, Le Mesnil Saint Denis (FR)

(72) Inventors: Gérald Caillot, Le Mesnil Saint Denis (FR); Jean Michel Jarasson, Le Mesnil Saint Denis (FR); Vincent Izabel, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 845 days.

(21) Appl. No.: 16/445,846

(22) Filed: Jun. 19, 2019

(65) Prior Publication Data
US 2019/0381974 A1 Dec. 19, 2019

(30) Foreign Application Priority Data
Jun. 19, 2018 (FR) ...................................... 1855404

(51) Int. Cl.
*B60S 1/60* (2006.01)
*B08B 1/00* (2006.01)
(Continued)

(52) U.S. Cl.
CPC ................ *B60S 1/60* (2013.01); *B08B 1/005* (2013.01); *B08B 1/02* (2013.01); *B60S 1/522* (2013.01); *B60S 1/566* (2013.01); *G02B 27/0006* (2013.01)

(58) Field of Classification Search
CPC .. B60S 1/60; B60S 1/522; B60S 1/566; B60S 1/3886; B08B 1/005; B08B 1/02
(Continued)

(56) References Cited

U.S. PATENT DOCUMENTS

2012/0260939 A1* 10/2012 Jeuffe ..................... B60S 1/524
15/250.04
2014/0036132 A1 2/2014 Pawlowski
(Continued)

FOREIGN PATENT DOCUMENTS

DE       10058455 A1 *  6/2002  ............. B60S 1/524
DE  102015218682 A1     3/2017
(Continued)

OTHER PUBLICATIONS

Preliminary Report issued in Corresponding French Application No. 1855404, dated Feb. 18, 2019 (8 Pages).
(Continued)

*Primary Examiner* — Katina N. Henson
(74) *Attorney, Agent, or Firm* — Osha Bergman Watanabe & Burton LLP

(57) ABSTRACT

The invention concerns a module (10) for cleaning a device (3) for protection of an optical element having a surface of revolution around an axis of revolution, the cleaning module (10) including a wiper blade (11) configured to extend in a first general direction (D1) and including a wiper rubber (111) configured to extend in a second general direction (D2).
According to the invention:
the wiper rubber (111) is configured to wipe the surface of revolution during relative movement of rotation between the wiper blade (11) and the protection device (3), and
the cleaning module (10) further includes a cleaning liquid feed pipe (13) fixed to the wiper blade (11) and including at least one opening (131) for spraying cleaning liquid disposed in such a manner as to define a spraying direction forming an angle less than 15° with the second direction (D2).
The invention also concerns a corresponding driving assistance system.

14 Claims, 5 Drawing Sheets

Figure 1:
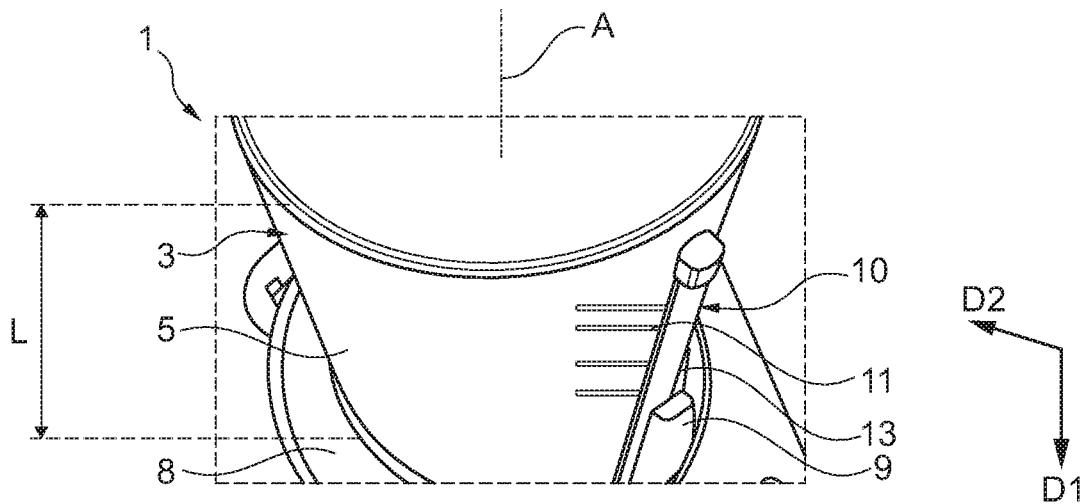

(51) Int. Cl.
  *B08B 1/02*   (2006.01)
  *B60S 1/52*   (2006.01)
  *B60S 1/56*   (2006.01)
  *G02B 27/00*  (2006.01)

(58) Field of Classification Search
  USPC ........................................................ 359/509
  See application file for complete search history.

(56) References Cited

U.S. PATENT DOCUMENTS

2016/0244028 A1    8/2016  Wakatsuki
2017/0151933 A1*  6/2017  Doorley .................... B60S 1/08
2018/0370500 A1  12/2018  Garcia Crespo et al.

FOREIGN PATENT DOCUMENTS

| JP | 2014-080167 A | 5/2014 |
| JP | 2016-155497 A | 9/2016 |
| JP | 2017-165413 A | 9/2017 |
| WO | 2013045396 A1 | 4/2013 |

OTHER PUBLICATIONS

Japanese Office Action issued in Japanese Application No. 2019-113005 dated Jun. 30, 2023 (22 pages).

* cited by examiner

MODULE FOR CLEANING AN OPTICAL ELEMENT OR A DEVICE FOR PROTECTING AN OPTICAL ELEMENT AND ASSOCIATED DRIVING ASSISTANCE SYSTEM

The present invention relates to the field of driving assistance and in particular to the driving assistance systems installed on some motor vehicles.

A driving assistance system may include at least one optical element. The invention more particularly concerns a module for cleaning a device for protecting an optical element of this kind of driving assistance system.

The optical element of a driving assistance system is configured to emit and/or to capture optical signals in order to determine road scenes or again an environment around the motor vehicle. In the case of optical elements capturing optical signals, such optical elements may for example be video cameras including at least one lens. Also, in the case of elements emitting and capturing optical signals, such optical elements may use a Lidar (Light Detection And Ranging) technology.

At present, a large number of motor vehicles are equipped with numerous optical elements in order to facilitate parking them or to offer the motor vehicle some autonomy. In this second case, there may be nonlimitingly cited line crossing detectors, automatic emergency braking systems, adaptive speed regulators, dead spot detection devices or again some equipment such as the Lidar technology for vehicles, for example autonomous vehicles.

Such optical elements are generally installed on the outside of the motor vehicle, for example at the level of the roof, the front or rear wings, the wing mirrors, or again the pillars at the sides of the windscreen of the motor vehicle. These optical elements are therefore very exposed to organic or mineral dirt, for example dust or insects, and also to inclement weather that may leave traces of water for example in the field of view and/or of emission of the optical element, which can compromise its correct operation and therefore that of the driving assistance system.

Driving assistance systems increasingly have a surface of revolution in order to be able to capture road scenes all around the motor vehicle for example, and generally have a relatively small radius of curvature, that is to say a sharp curvature, for reasons of aerodynamics for example, or again to reduce the overall size of these driving assistance systems, in particular the detection optical elements or equipment. There may in particular be cited the driving assistance systems using the Lidar technology.

There is known for example from the document US 2016/0244028 a module for cleaning a protection device surrounding an optical element of a driving assistance system and having an axis of revolution. The cleaning module employs a wiper blade and cleaning liquid feed pipes in order to spray cleaning liquid onto the protection device. These elements are intended to be rotated by a motor about the axis of revolution of the protection device in order to enable it to be cleaned. However, the times needed between spraying the cleaning liquid and wiping the surface of the protection device on which cleaning liquid is present can be long, which leads to poor operability of the driving assistance system because of the presence of the cleaning liquid in the field of view or of emission of the optical element housed inside the protection device.

An objective of the present invention is at least partly to alleviate the disadvantages of the prior art described above by proposing a module for cleaning a device for protecting an optical element having a surface of revolution, said cleaning module guaranteeing correct operation of a driving assistance system during cleaning of the protection device.

Another objective of the present invention, different from the previous objective, is to propose a driving assistance system cleaning of which is effective and simple to execute when the motor vehicle is in motion or stationary.

To this end, to achieve at least in part at least one of the aforementioned objectives, the present invention consists in a module for cleaning a protection device of an optical element, in particular intended to equip a motor vehicle. The protection device has a surface of revolution around an axis of revolution.

The cleaning module includes a wiper blade configured to extend in a first general direction parallel to the axis of revolution of the protection device. The wiper blade includes a wiper rubber configured to extend from the wiper blade toward the surface of revolution in a second general direction perpendicular to the first general direction of extension of the wiper blade. The wiper rubber is configured to wipe the surface of revolution of the protection device during a relative movement of rotation between the wiper blade and the protection device about the revolution axis. The cleaning module further includes a cleaning liquid feed pipe fixed to the wiper blade.

The cleaning liquid feed pipe includes at least one opening for spraying cleaning liquid. The opening is disposed in such a manner as to define a direction of spraying the cleaning liquid forming an angle between 0° and 15° inclusive with the second general direction.

The presence of the cleaning liquid feed pipe fixed to the wiper blade enables the cleaning liquid to be sprayed as close as possible to the wiper rubber so as to enable rapid wiping by the latter during the relative movement in rotation of the protection device with respect to the wiper blade about the axis of revolution of the protection device. The operability of the driving assistance system is therefore preserved when cleaning the protection device. Also, the possibility of connecting the cleaning liquid feed pipe makes it possible to limit the width of the cleaning module and therefore the area of the field of view of the optical element obstructed by that cleaning module on the protection device during cleaning of the latter.

The cleaning module according to the invention may further include one or more of the following features separately or in combination.

According to one particular embodiment, the cleaning liquid feed pipe includes a plurality of openings disposed in a row.

According to one variant of that particular embodiment, the row formed by the openings is disposed parallel to the first direction of general extension of the wiper blade.

According to one aspect, the cleaning liquid feed pipe is fixed to the wiper blade on the side opposite the wiper rubber.

The wiper rubber is disposed as close as possible to the surface of revolution of the protection device.

The wiper rubber may include at least one heel piece disposed opposite the end of the wiper rubber configured to be disposed in contact with the surface of revolution of the protection device.

The wiper blade may further include at least one stiffener spine extending in the first general direction, said stiffener spine being disposed on the wiper blade on the side opposite the wiper rubber. This stiffener spine is configured to maintain the wiper rubber in contact with the surface of revolution of the protection device.

The stiffener spine may serve to support the cleaning liquid feed pipe.

According to one particular embodiment, the wiper blade may include two stiffener spines disposed on respective opposite sides of the wiper rubber.

Alternatively, the wiper blade may include a single stiffener spine.

The stiffener spine may have a cross section in the shape of a C or a claw shape so as to sandwich at least a part of the heel piece of the wiper rubber.

The stiffener spine is for example in the form of a blade and may be disposed on the heel piece.

The stiffener spine may extend over the whole of or over a part of the length of the wiper blade.

The wiper blade may further include at least one element for fixing said wiper blade to an arm.

According to a first aspect, the fixing element is disposed substantially at the centre of the wiper blade.

According to another aspect, the fixing element is disposed at the level of one end of the wiper blade.

The cleaning liquid feed pipe includes at least two clipping means configured to connect said cleaning liquid feed pipe to the wiper blade.

According to one particular embodiment, the at least two clipping means are attached to the cleaning liquid feed pipe.

According to another particular embodiment, the clipping means are in one piece with the cleaning liquid feed pipe.

The cleaning module further includes first and second end caps disposed at the longitudinal ends of the wiper blade.

The first and second end caps cooperate with the wiper blade on the side opposite the wiper rubber.

The first and second end caps may also cooperate with the at least one stiffener spine.

According to a first aspect, the cleaning liquid feed pipe includes an inlet for feeding the cleaning liquid feed pipe with cleaning liquid disposed at a first end of the cleaning liquid feed pipe.

According to one particular embodiment of this first aspect, the inlet of the cleaning liquid feed pipe cooperates with the first end cap, said first end cap being configured to make the connection between the inlet of the cleaning liquid feed pipe and a main pipe intended to feed the cleaning liquid feed pipe with cleaning liquid.

According to a first variant, the second end cap may cooperate with a second end of the cleaning liquid feed pipe opposite the first end.

According to this first variant, the second end of the cleaning liquid feed pipe includes an opening configured to cooperate with a pin carried by the second end cap.

According to another variant, the second end of the cleaning liquid feed pipe may be solid.

According to a third variant, the second end cap may include a sealing device configured to cooperate with the second end of the cleaning liquid feed pipe in order to prevent leaks of the cleaning liquid contained in this cleaning liquid feed pipe.

According to a second aspect, the cleaning liquid feed pipe includes an inlet for supplying the cleaning liquid feed pipe with cleaning liquid, said inlet being disposed in an offset manner relative to the first and second ends of the cleaning liquid feed pipe.

According to one particular embodiment of this second aspect, the inlet of the cleaning liquid feed pipe is disposed in a plane defined by the second general direction of the wiper rubber.

According to a first variant, the first and second ends of the cleaning liquid feed pipe may be solid.

According to a second variant, the first and second ends of the cleaning liquid feed pipe each include an opening.

According to these first and second variants, the first and second end caps are respectively connected to the first and second ends of the cleaning liquid feed pipe.

According to this second variant, the first and second end caps may each include a sealing device configured to cooperate with the openings at the first and second ends of the cleaning liquid feed pipe in order to prevent leaking of the cleaning liquid contained in the cleaning liquid feed pipe.

According to one particular embodiment, the inlet of the cleaning liquid feed pipe may be connected directly to a main pipe configured to supply the cleaning liquid feed pipe with cleaning liquid.

According to another particular embodiment, the cleaning module includes at one first clipping means and one second clipping means disposed at the ends of the cleaning liquid feed pipe so as to assure its cooperation with the wiper blade. The first clipping means is disposed at the inlet of the cleaning liquid feed pipe and configured to make the connection between the inlet and a main pipe intended to supply the cleaning liquid feed pipe with cleaning liquid.

The second clipping means may be disposed at the second end of the cleaning liquid feed pipe and include a sealing device configured to block the opening at the second end of the cleaning liquid feed pipe in order to prevent leaking of the cleaning liquid contained in the cleaning liquid feed pipe.

The cleaning module may further include additional clipping means, said additional clipping means being disposed substantially at the centre of the cleaning liquid feed pipe.

According to one aspect, the wiper blade may be a heated wiper blade.

According to another aspect, the cleaning liquid feed pipe may be a heated pipe so as to heat the cleaning liquid before it is sprayed onto the surface of revolution of the protection device.

The present invention also consists in a driving assistance system, in particular for a motor vehicle, including at least one optical element and at least one device for protection of said at least one optical element having a surface of revolution about an axis of revolution, the driving assistance system further including:
- at least one module as described above for cleaning said at least one protection device, the cleaning module including a wiper blade configured to extend in a first general direction parallel to the axis of revolution of the protection device, and
- at least one actuator configured to generate the relative movement of rotation between the protection device and the wiper blade of the cleaning module about the axis of revolution of the protection device.

The driving assistance system may further have one or more of the following features separately or in combination.

The protection device may be disposed at least in part outside the bodywork element of the motor vehicle.

According to one aspect, the protection device may project relative to the bodywork element of the motor vehicle.

According to one particular embodiment, the protection device has a cylindrical shape.

According to one aspect, the protection device is part of the optical element.

According to an alternative, the protection device is an element distinct from the optical element and the surface of revolution is configured to be arranged around said at least one optical element.

The optical element may be chosen among an optical sensor or an optical sensor coupled to an optical emitter.

According to one particular embodiment, the driving assistance system employs Lidar technology corresponding to the emission of a laser beam and to the detection of the received echo in order to determine the distance separating the motor vehicle from another object.

According to a first particular embodiment, the protection device is configured to be mounted on and fixed to the motor vehicle and the wiper blade is configured to be mounted to be mobile relative to the protection device.

According to a second particular embodiment, the wiper blade is configured to be mounted on and fixed to the motor vehicle and the protection device is configured to be mounted to be mobile relative to the wiper blade.

The at least one actuator may be chosen among: pneumatic, electric, or again magnetic actuators.

According to one aspect, the at least one actuator is configured to move the wiper blade relative to the protection device at a speed between 5 and 30 revolutions/minute inclusive.

The wiper blade may extend over substantially the entire length of the protection device.

The driving assistance system may further include an electronic control unit configured to control the cleaning of the protection device by the cleaning module.

According to one aspect, the electronic control unit may be configured to trigger cleaning of the protection device, said cleaning including:
- a step of supplying the cleaning liquid feed pipe with cleaning liquid in order to execute a step of spraying cleaning liquid onto the surface of revolution of the protection device, and
- a step of wiping the surface of revolution during relative movement between the wiper blade of the cleaning module and the protection device.

According to a first variant, the electronic control unit may be configured to trigger cleaning of the protection device at the end of a predetermined time of use of the driving assistance system.

According to another variant, the electronic control unit may be configured to trigger cleaning of the protection device when the presence of dirt on the protection device is detected by the optical element.

The electronic control unit may be configured to control the inlet of the cleaning liquid feed pipe in order to control the flow rate of the cleaning liquid inside the cleaning liquid feed pipe during the step of supplying the cleaning liquid feed pipe.

According to one particular embodiment, the cleaning liquid feed pipe is disposed on the wiper blade in such a manner as to spray cleaning liquid onto the surface of revolution before the passage of the wiper rubber during the wiping step.

According to one aspect, the method of cleaning the protection device may be triggered when the motor vehicle is stationary.

According to another aspect, the method of cleaning the protection device may be triggered when the motor vehicle is moving.

Alternatively, the method of cleaning the protection device may include a step of stopping spraying cleaning liquid to enable detection of any dirt still present on the protection device.

According to a variant, the method of cleaning the protection device may include a pause step in which the relative movement of rotation of the wiper blade with respect to the protection device and the spraying of cleaning liquid are stopped in order to enable detection of the presence of any dirt on the protection device.

The electronic control unit may be configured in such a manner that cleaning the protection device has a duration less than 2 minutes.

Figure 2A:
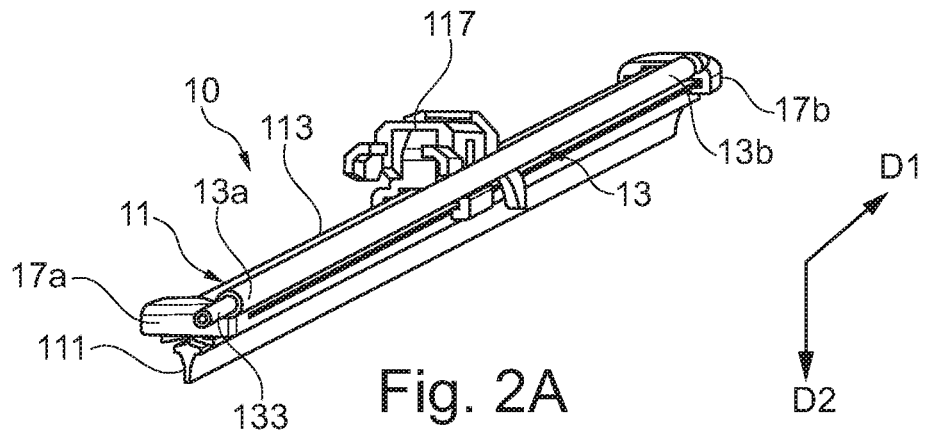
Figure 2B:
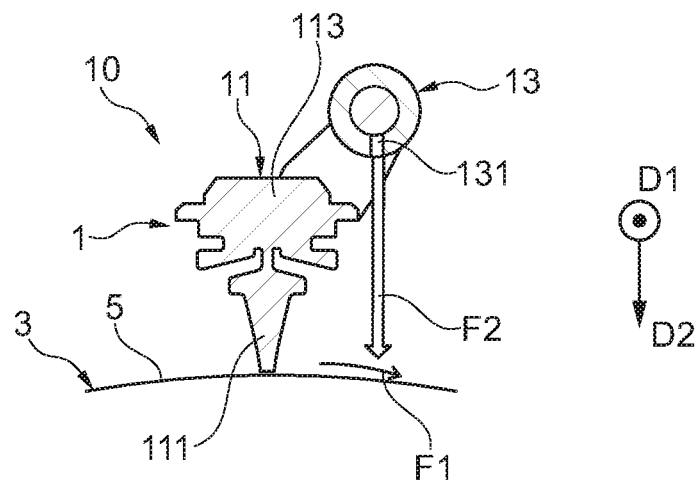
Figure 2C:
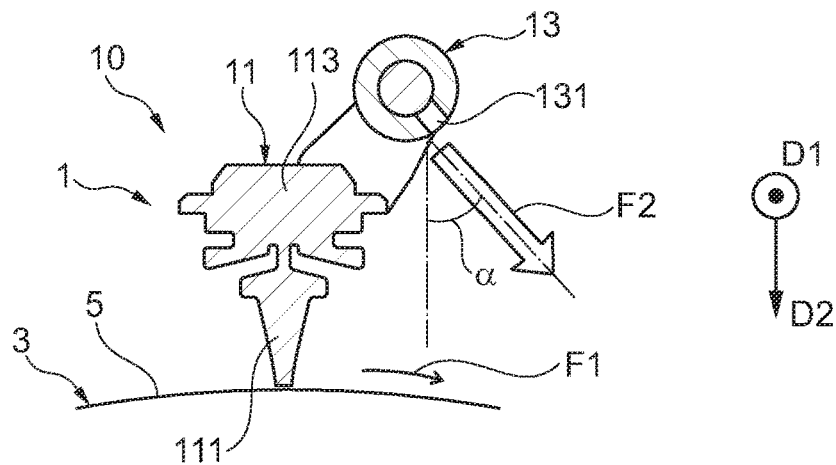
Figure 3:
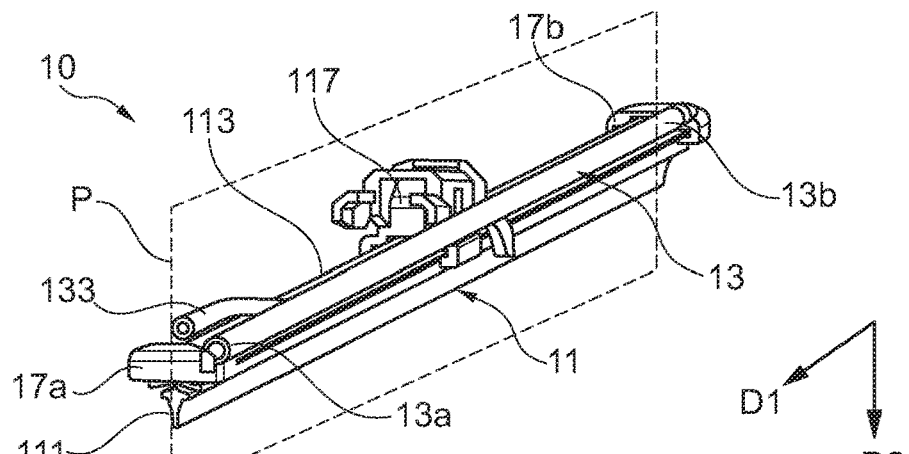
Figure 6:
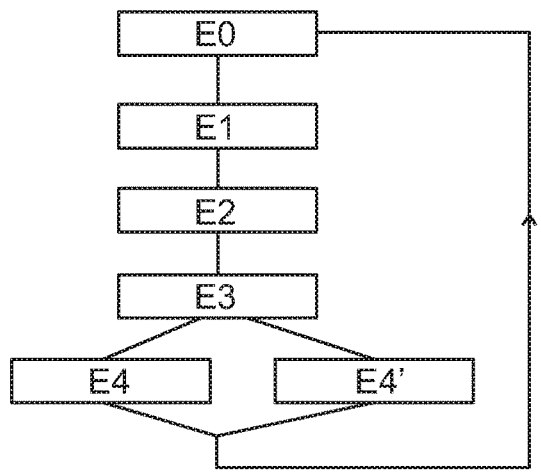
Figure 4A:
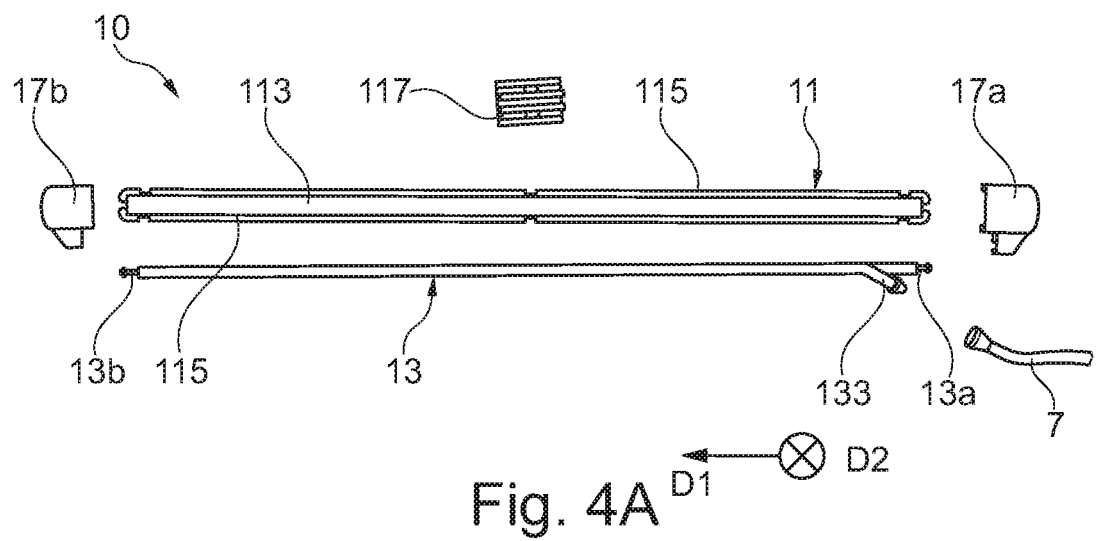
Figure 4B:
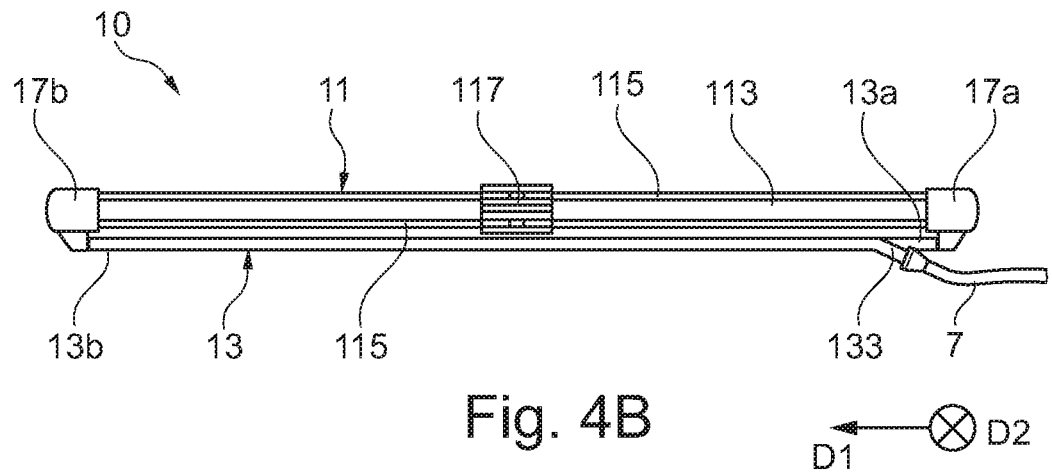
Figure 4C:
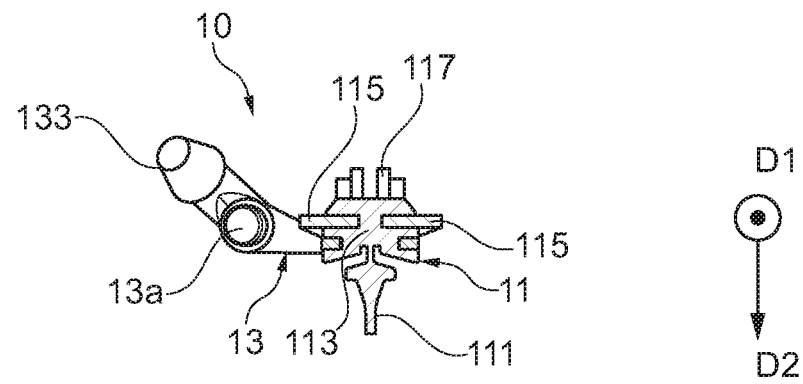
Figure 4D:
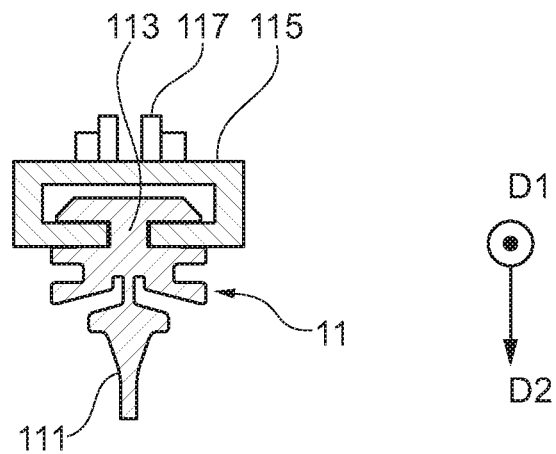
Figure 4E:
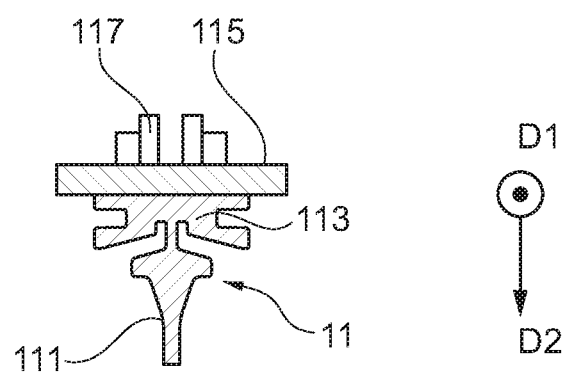
Figure 5A:
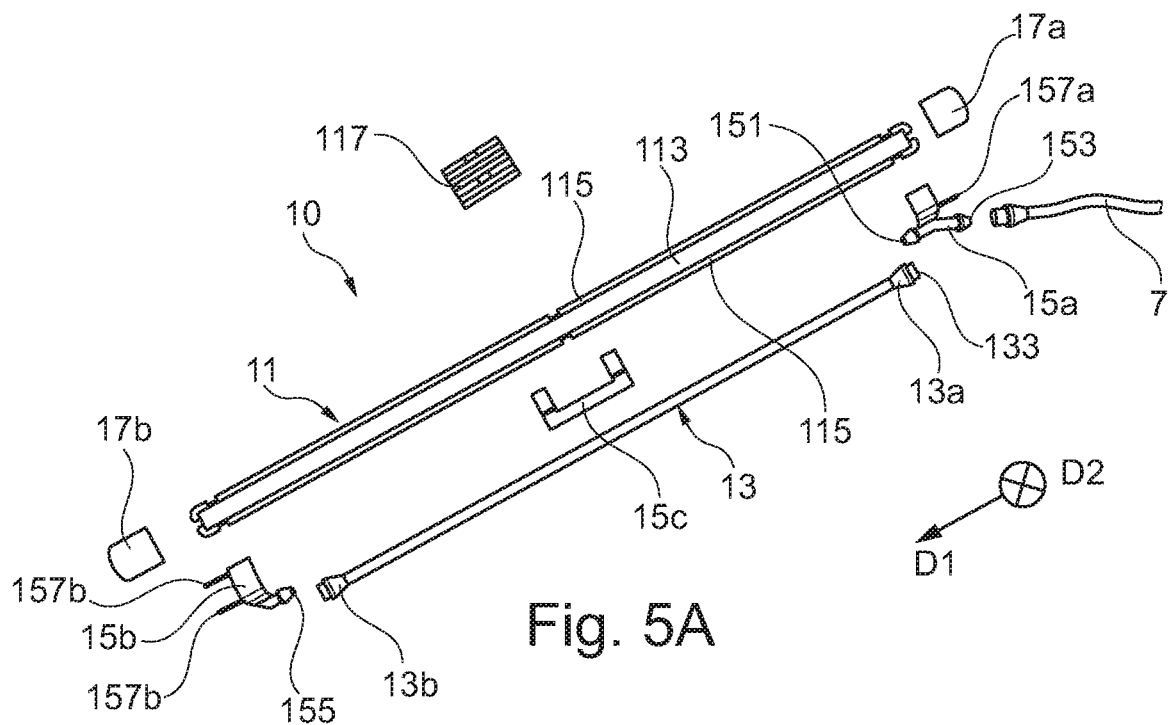
Figure 5B:
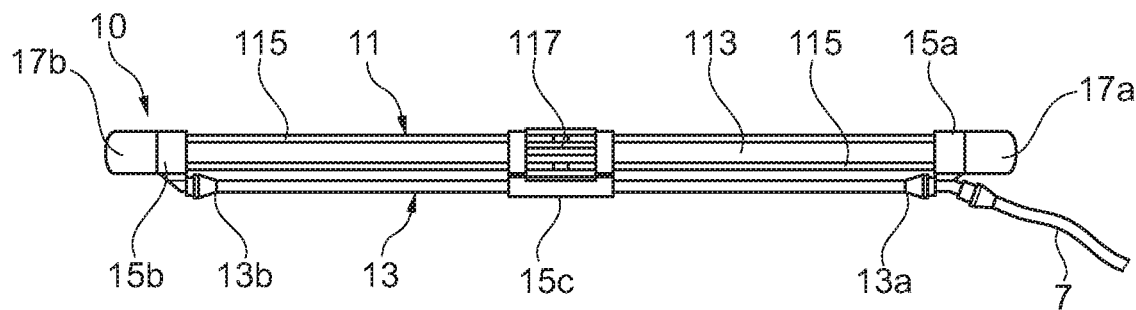
Figure 5C:
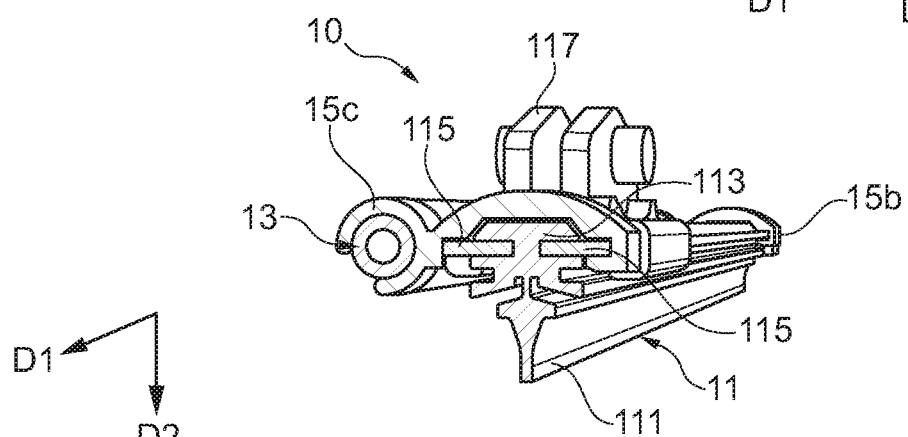

Other features and advantages of the present patent application will become more clearly apparent on reading the following description given by way of nonlimiting illustration and from the appended drawings, in which:

FIG. 1 is a diagrammatic perspective view of a driving assistance system including a cleaning module, FIG. 2A is a diagrammatic perspective view of a cleaning module according to one embodiment, FIG. 2B is a front view in cross section of the cleaning module from FIG. 2A according to a first variant, FIG. 2C is a diagrammatic front view in cross section of the cleaning module from FIG. 2A according to a second variant, FIG. 3 is a diagrammatic perspective view of a cleaning module according to another embodiment, FIG. 4A is a diagrammatic exploded view of a cleaning module according to one particular embodiment, FIG. 4B is a diagrammatic view of the assembled cleaning module from FIG. 4A, FIG. 4C is a diagrammatic view in cross section of the cleaning module from FIG. 4B, FIG. 4D is a diagrammatic view in cross section of a cleaning module according to a variant of FIG. 4C, FIG. 4E is a diagrammatic view in cross section of a cleaning module according to another variant of FIG. 4C, FIG. 5A is a diagrammatic exploded view of a cleaning module according to another particular embodiment, FIG. 5B is a diagrammatic view of the assembled cleaning module from FIG. 5A, FIG. 5C is a diagrammatic representation in cross section of the cleaning module from FIG. 5B, and FIG. 6 is a diagrammatic representation of a flowchart showing various steps of a method of cleaning a protection device.

Identical elements in the various figures bear the same reference numbers.

The following embodiments are examples. Although the description refers to one or more embodiments, this does not necessarily mean that each reference concerns the same embodiment or that the features apply only to only one embodiment. Single features of different embodiments may also be combined and/or interchanged to provide other embodiments.

In the following description, reference is made to first and second general directions, first and second end caps, first and second ends of the cleaning liquid feed pipe, first and second clipping means, first and second cooperation means of the first clipping means, and first and second cooperation elements. This indexing is merely to differentiate and to designate elements that are close but not identical. Nor does this indexing imply an order in time for assessing the disposition of the various elements constituting the driving assistance system or again constituting the cleaning module.

In the following description, reference is made to an orientation defined by first and second general directions as represented arbitrarily in the dihedron D1, D2 represented in FIGS. 1 to 5C. The orientation of these directions is chosen according to the general orientation of a cleaning module when installed on a driving assistance system. However, this does not limit the orientation that the cleaning module may assume in its application to a driving assistance system.

Driving Assistance System

Referring to FIG. 1, there is partly represented a driving assistance system 1, in particular for a motor vehicle, including at least one optical element, at least one protection device 3, and a cleaning module 10 for each protection device 3. Also, the driving assistance system 1 includes at least one actuator 9. One or more actuators 9 may be provided for each protection device 3 or for each cleaning module 10.

The optical element may be chosen among an optical sensor, such as a video camera configured to capture and to transmit road scenes, for example, or an optical sensor coupled to a Lidar technology optical emitter, for example, corresponding to the emission of a laser beam and to detection of the echo received in order to determine the distance separating the motor vehicle from another object, or again a combination of those elements. The optical element is intended to be housed in a corresponding protection device 3. In this case, the protection device 3 is an element distinct from the optical element and attached to the latter. According to a variant, the protection device 3 may be part of the optical element.

Also, the driving assistance system 1 may include a plurality of optical elements that may be housed in a common protection device 3. The optical elements may be arranged so that their respective fields of view are oriented in different directions in order to capture different road scenes all around the motor vehicle.

Accordingly, the optical elements may have different angles of view depending on the number and type of components of the optical element. The angle of view of the or each optical element is preferably between 60° and 360° inclusive. With optical elements of this kind, the driving assistance system 1 may equip autonomous vehicles for example.

The protection device 3 includes a surface of revolution 5 around an axis of revolution A. This surface of revolution 5 may be configured to be arranged around the optical element in order to protect the latter from deterioration that it could suffer, notably by being sprayed with solid elements of mineral or organic origin, such as gravel or insects. In a variant, the surface of revolution 5 may be an integral part of the optical element.

The surface of revolution 5 is for example cylindrical. According to this particular embodiment, the protection device 3 has a length L that may for example be between 50 mm and 350 mm inclusive, in particular between 250 mm and 300 mm On the other hand, the protection device 3 has a diameter, for example, between 60 mm and 800 mm inclusive. The protection device 3 therefore has a small radius of curvature (or again a sharp curvature).

Also, the protection device 3 is intended to be disposed at least in part outside a bodywork element of the motor vehicle. The protection device 3 may more particularly project relative to the bodywork element of the motor vehicle. The optical element disposed inside the protection device 3 may therefore capture road scenes disposed all around the motor vehicle without disturbance from road scenes that may for example be caused by the lateral pillars of the motor vehicle.

Different embodiments of the cleaning module 10 are shown in FIGS. 2A to 5C. The cleaning module 10 includes in particular a wiper blade 11 and a cleaning liquid feed pipe 13 (not shown in FIGS. 4D and 4E) fixed to the wiper blade 11.

The wipe blade 11 extends in a first general direction D1. The wiper blade 11 extends longitudinally. The first general direction D1 is for example parallel to the axis of revolution A of the protection device 3 as shown in FIG. 1.

Referring to FIGS. 1 and 2A to 3, 4C to 4E and 5C, the wiper blade 11 includes a wiper rubber 111 configured to extend from the wiper blade 11 toward the surface of revolution 5 in a second general direction D2 perpendicular to the first general direction D1 of extension of the wiper blade 11. The wiper rubber 111 is configured to wipe the surface of revolution 5 of the protection device 3 during relative movement of rotation between the wiper blade 11 and the protection device 3 around the axis of revolution A. This kind of wiper blade 11 with a wiper rubber 111 has a simple structure.

The wiper blade 11 extends substantially all the length L of the protection device 3 (see FIG. 1). The wiper rubber 111 (visible in FIGS. 2B and 2C for example) is therefore able to wipe the whole of the surface of revolution 5 in order to guarantee correct operation of the at least one optical element. According to a variant that is not shown, the wiper blade 11 may extend over only a part of the length L of the protection device 3. According to this variant, the wiper blade 11, and more particularly the wiper rubber 111, extend in such a manner as to be able to wipe at least the surface of revolution 5 disposed in the field of view of the at least one optical element. This variant can enable reduction of the size of the wiper blade 11 and therefore limit the costs of the cleaning module 10.

Also, the wiper blade 11 may be a heated wiper blade. This in particular enables improved flexibility of the wiper blade 11 in such a manner that the wiper rubber 111 follows the curvature of the surface of revolution 5 of the protection device 3. In fact, the heating function enables improved turnaround of the wiper rubber 111, for example in the event of ice accumulating on a hinge in cold weather, by enabling thawing of that ice.

The wiper blade 11 further includes for example at least one heel piece 113 (visible in FIGS. 2A to 5C) of the wiper rubber 111. The heel piece 113 is disposed at the end opposite the end of the wiper rubber 111 intended to wipe the surface of revolution 5 of the protection device 3.

The wiper blade 11 may further include a first end cap 17a and a second end cap 17b (see FIGS. 2A, 3 to 4B, 5A and 5B). The end caps 17a, 17b are disposed at the longitudinal ends of the wiper blade 11. They cooperate for example at least with the heel piece 113 of the wiper blade 11.

Also, and optionally, the wiper blade 11 may include at least one stiffener spine 115 (visible in FIGS. 4A to 5C) extending in the first general direction D1. This kind of stiffener spine 115 may also be termed a spline. The stiffener spine 115 is disposed on the wiper blade 11 on the side opposite the wiper rubber 111. Different variants for the disposition of the stiffener spine 115 on the wiper blade 11 are described in more detail hereinafter.

Also, the cleaning module 10 may include at least one fixing element 117 for fixing the wiper blade 11 to an arm (not shown) for fixing it to the motor vehicle. According to the particular embodiment from FIG. 2A, the fixing element 117 is disposed on the heel piece 113, substantially at the centre of the wiper blade 11. According to an alternative not shown here, the fixing element 117 may be disposed elsewhere, for example at an end of the wiper blade 11.

Referring to FIGS. 2A to 4C and 5A to 5C, the cleaning liquid feed pipe 13 may for example be made of rubber, plastic or again metal.

The cleaning liquid feed pipe 13 includes at least one opening 131 (visible in FIGS. 2B and 2C) for spraying cleaning liquid. The at least one opening 131 may for example be produced by a laser.

The cleaning liquid feed pipe 13 may include a plurality of openings 131 forming at least one row. According to this variant, the at least one row formed by the openings 131 may be disposed parallel to the first general direction D1 of extension of the wiper blade 11 for example.

The at least one opening 131 is disposed in the cleaning liquid feed pipe 13 in such a manner as to define a direction of spraying the cleaning liquid, diagrammatically indicated by the arrow F2, forming with the second general direction D2 an angle α (visible in FIG. 2C) between 0° and 15° inclusive, preferably less than or equal to 10°. According to the embodiment from FIG. 2B, the cleaning liquid spraying angle α relative to the second general direction D2 is zero. According to the embodiment from FIG. 2C, the angle α is non-zero.

In fact, because of the small radius of curvature of the surface of revolution 5, the spraying angle α is chosen to be sufficiently small to enable spraying of the cleaning liquid onto the surface of revolution 5.

Also, the cleaning liquid may be sprayed via the opening or openings 131 on the surface of revolution 5 in the vicinity of the wiper rubber 111 in order for the latter to wipe the sprayed cleaning liquid shortly after spraying. This enables limitation of the disturbance to the field of view of the optical element in the area in which the spraying of cleaning liquid occurs.

By modulating the angle α of spraying the cleaning liquid onto the surface of revolution 5 as a function of its radius of curvature, it is possible to spray the cleaning liquid effectively in order to guarantee effective cleaning of the surface of revolution 5. The angle α of spraying cleaning liquid onto the surface of revolution 5 may for example be adjusted during installation of the cleaning liquid feed pipe 13 on the wiper blade 11 by pivoting that pipe on itself about a central axis (not shown) of the cleaning liquid feed pipe 13. The central axis of the cleaning pipe 13 is parallel to the first general direction D1 of the wiper blade 11 in the example described here.

The protection device 3 may therefore be cleaned effectively whatever its radius of curvature during relative movement of rotation between the wiper blade 11 and the protection device 3.

According to one particular embodiment, the cleaning liquid feed pipe 13 may be a heated pipe so as to heat the cleaning liquid before it is sprayed onto the surface of revolution 5 of the protection device 3 in order for example to enable deicing of the surface of revolution 5.

Also, as shown in FIGS. 2A to 2C, the cleaning liquid feed pipe 13 is fixed to the wiper blade 11 on the side opposite the wiper rubber 111. The heel piece 113 may more particularly serve to support the cleaning liquid feed pipe 13.

Also, the cleaning liquid feed pipe 13 may extend longitudinally and include a first end 13a and a second end 13b. The second end 13b is opposite the first end 13a in the longitudinal direction.

Also, the cleaning liquid feed pipe 13 includes an inlet 133 (FIGS. 2A, 3 to 4C and 5A) configured to supply the cleaning liquid feed pipe 13 with cleaning liquid.

According to the particular embodiment from FIG. 2A, the inlet 133 may be disposed at the first end 13a of the cleaning liquid feed pipe 13 or in line with the first end 13a. The inlet 133 may be connected directly to a main pipe 7 (visible in FIGS. 4A, 4B, 5A and 5B) configured to supply the cleaning liquid feed pipe 13 with cleaning liquid. According to this particular embodiment, the cleaning liquid feed pipe 13 has a relatively simple structure.

Referring to FIGS. 2A, and 3 to 4B, the first end cap 17a and the second end cap 17b may respectively cooperate with the first end 13a or the second end 13b of the cleaning liquid feed pipe 13, as described in more detail hereinafter.

According to a variant not shown here, the inlet 133 of the cleaning liquid feed pipe 13 disposed at the first end 13a of the cleaning liquid feed pipe 13 may cooperate with the first end cap 17a. In this case, the first end cap 17a is configured to provide the connection between the inlet 133 of the cleaning liquid feed pipe 13 and the main pipe 7 intended to supply the cleaning liquid feed pipe 13 with cleaning liquid. The first end cap 17a therefore includes means for connecting it to the main pipe 7.

Referring to FIGS. 2A, and 3 to 4B, the second end cap 17b cooperates for example with the second end 13b of the cleaning liquid feed pipe 13. The second end cap 17b may be designed to block an opening at the second end 13b of the cleaning liquid feed pipe 13. In order to prevent possible leaks of cleaning liquid, the second end cap 17b advantageously includes a sealing device configured to cooperate with the second end 13b of the cleaning liquid feed pipe 13.

According to the embodiments shown in FIGS. 2A, 3 to 4B, 5A and 5B, the cleaning liquid feed pipe 13 extends over substantially all of the wiper blade 11.

According to another variant not shown here, the cleaning liquid feed pipe 13 may extend over only a part of the wiper blade 11. According to this other variant, the second end 13b of the cleaning liquid feed pipe 13 is solid in order to retain the cleaning liquid inside this cleaning liquid feed pipe 13.

Referring to FIG. 3, there is shown the cleaning liquid feed pipe 13 according to an alternative embodiment. This alternative embodiment differs from the embodiment from FIG. 2A in that the inlet 133 of the cleaning liquid feed pipe 13 is disposed in an offset manner relative to the first end 13a and the second end 13b of the cleaning liquid feed pipe 13. The inlet 133 is more particularly disposed above the wiping rubber 111, in the disposition of the elements in FIG. 3, and in a plane P defined by the directions D1 and D2. The inlet 133 is disposed on the side of the wiper arm 11 opposite the side intended to face the surface of revolution 5 (not visible in FIG. 3). The inlet 133 of the cleaning liquid feed pipe 13 is therefore hidden by the wiper rubber 111 and by the heel piece 113 and is therefore not present in the field of view of the at least one optical element.

Referring to FIGS. 3 to 4B, the first end cap 17a may cooperate for example with the first end 13a of the cleaning liquid feed pipe 13. According to the particular embodiments shown in these figures, the first end cap 17a may be designed to block an opening at the first end 13a of the cleaning liquid feed pipe 13. In order to prevent possible leaks of cleaning liquid, the first end cap 17a advantageously includes a sealing device configured to cooperate with the first end 13a of the cleaning liquid feed pipe 13.

According to a variant of this alternative embodiment not shown here, the cleaning liquid feed pipe 13 extends over only a part of the wiper blade 11. According to this variant, the first end 13a and the second end 13b of the cleaning liquid feed pipe 13 may be solid in order to prevent any leaking of the cleaning liquid contained in this cleaning liquid feed pipe 13. This variant makes it possible, inter alia, to dispense with the use of sealing devices cooperating with the first end 13a and the second end 13b of the cleaning liquid feed pipe 13, which makes it possible to simplify the structure of the cleaning module 10.

Referring to FIGS. 4A to 4C, there is shown the cleaning module 10 in accordance with one particular embodiment. According to this particular embodiment, the wiper blade 11 includes two stiffener spines 115 disposed on respective opposite sides of the wiper blade 11, to be more precise of the heel piece 113 of the wiper rubber 111, in other words sandwiching the heel piece 113 of the wiper rubber 111.

As shown in FIGS. 4A and 4B, the first end cap 17a and the second end cap 17b also cooperate with the at least one stiffener spine 115 as well as with the first end 13a and the second end 13b of the cleaning liquid feed pipe 13.

According to this embodiment it may be envisaged that the inlet 133 of the cleaning liquid feed pipe 13 is disposed in an offset manner relative to the first end 13a and the second end 13b of the cleaning liquid feed pipe 13. Also, this cleaning liquid feed pipe 13 is connected directly to the main pipe 7. A configuration of this kind of the cleaning module 10 is relatively simple to manufacture and to assemble, which inter alia enables limitation of the costs associated with a driving assistance system 1 (visible in FIG. 1) provided with this kind of cleaning module 10. This kind of arrangement is not limited to the situation of the wiper blade 11 including stiffener spines 115 and may be adapted to other embodiments.

Also, as shown in FIG. 4C, the inlet 133 of the cleaning liquid feed pipe 13 is disposed substantially above the first end 13a of that cleaning liquid feed pipe 13. A configuration of this kind notably enables reduction of the width of the cleaning module 10 in order to limit the disturbance to the images captured by the at least one optical element.

Referring to FIGS. 4D and 4E, there are shown two variants of FIG. 4C. In order not to overload these figures, the cleaning fluid feed pipe 13 is omitted from these figures. These FIGS. 4D and 4E show two embodiments corresponding to the structure of the stiffener spine 115.

In a first variant, shown in FIG. 4D, the wiper blade 11 has a single stiffener spine 115 that holds the heel piece 113 of the wiper rubber 111. This stiffener spine 115 has for example a C-shaped cross section or a claw shape, in such a manner as to sandwich at least a part of the heel piece 113. At least a part of the heel piece 113 is therefore housed inside the C of the stiffener spine 115. The heel piece 113 advantageously has a complementary shape to the stiffener spine 115. For example, the heel piece 113 may include grooves in order to enable cooperation between the heel piece 113 and the ends of the "C" of the stiffener spine 115.

According to this variant, the fixing element 117 is disposed on the stiffener spine 115. Also, according to this particular embodiment the stiffener spine 115 may serve as a support for the cleaning liquid feed pipe 13.

According to another variant shown in FIG. 4E, the wiper blade 11 includes a stiffener spine 115, for example in the form of a blade, disposed on the heel piece 113 of the wiper rubber 111. The stiffener spine 115 may cooperate with the heel piece 113 by gluing it thereto for example.

According to this other variant, the stiffener spine 115 may also be disposed between the heel piece 113 and the fixing element 117.

According to the various embodiments shown in FIGS. 4C to 4E, the at least one stiffener spine 115 may extend over all the length of the wiper blade 11 or over only a part of that length.

Referring to FIGS. 5A to 5C, there is shown the cleaning module 10 according to a variant of the particular embodiment described with reference to FIGS. 4A to 4C. According to this variant, the cleaning module 10 further includes at least two clipping means 15a, 15b for fixing this cleaning liquid feed pipe 13 to the wiper blade 11.

According to this variant, the cleaning liquid feed pipe 13 is connected to the wiper blade by three clipping means 15a, 15b, 15c. These clipping means 15a, 15b, 15c are configured to sandwich the wiper blade 11, and more particularly the heel piece 113 and the at least one stiffener spine 115 when present, in order to fix the cleaning liquid feed pipe 13 to the wiper blade 11.

The cleaning module 10 more particularly includes at least one first clipping means 15a and one second clipping means 15b. The first clipping means 15a and the second clipping means 15b are disposed at the ends of the cleaning liquid feed pipe 13 in such a manner that it cooperates with the wiper blade 11.

The first clipping means 15a is disposed at the inlet 133 of the cleaning liquid feed pipe 13 and is configured to make the connection between the inlet 133 and the main pipe 7 intended to supply the cleaning liquid feed pipe 13 with cleaning liquid. To this end, the first clipping means 15a includes a first cooperation means 151 configured to make the connection between the first clipping means 15a and the inlet 133 of the cleaning liquid feed pipe and a second cooperation means 153 configured to make the connection between the first clipping means 15a and the main pipe 7.

Also, the second clipping means 15b is disposed at the second end 13b of the cleaning liquid feed pipe 13. According to this particular embodiment, the second clipping means 15b includes a cooperation means 155 configured to cooperate with the second end 13b of the cleaning liquid feed pipe 13, and more particularly with the opening at the second end 13b of the cleaning liquid feed pipe 13. The cooperation means 155 of the second clipping means 15b may include a sealing device configured to block the opening at the second end 13b of the cleaning liquid feed pipe 13 in order to prevent leaks of cleaning fluid contained in the cleaning liquid feed pipe 13.

Also, according to this particular embodiment, the first clipping means 15a and the second clipping means 15b respectively include a first cooperation element 157a and a second cooperation element 157b configured to cooperate respectively with the first end cap 17a and the second end cap 17b.

Also, the cleaning module 10 may further include additional clipping means 15c. The additional clipping means 15c are disposed substantially at the centre of the cleaning liquid feed pipe 13 and to strengthen the cooperation of the cleaning liquid feed pipe 13 with the wiper blade 11.

According to the particular embodiment shown in FIGS. 5A to 5C, the clipping means 15a, 15b, 15c are attached to the cleaning liquid feed pipe 13. According to a variant not shown here, the clipping means 15a, 15b, 15c may be in one piece with the cleaning liquid feed pipe 13.

Referring again to FIG. 1, the driving assistance system 1 may optionally include a cleaning liquid recovery channel 8 configured to collect the cleaning liquid running over the surface of revolution 5. This recovery channel 8 is for example disposed in contact with the bodywork element from which the protection device 3 projects. Also, it is possible to provide a system (not shown) for recirculation of the cleaning liquid in the direction of the inlet 133 of the cleaning liquid feed pipe 13 in order to enable recycling of the cleaning liquid recovered in this way. This recirculation system may in particular include a filtration device configured to retain any solid particles present in the recirculated cleaning liquid.

Also, according to the embodiment from FIG. 1, the at least one actuator 9 is configured to generate a relative movement of rotation between the protection device 3 and the wiper blade 11 of the cleaning module 10 around the axis of revolution A of the protection device 3, as shown by the arrow F1 in FIGS. 2B and 2C. The at least one actuator 9 may in particular be chosen among pneumatic, electric or again magnetic actuators. Also, according to the particular embodiment from FIG. 1, the at least one actuator 9 is configured to move the wiper blade 11 relative to the protection device 3 at a speed between 5 and 30 revolutions/minute inclusive. In fact, the speed of relative movement of the wiper blade 11 with respect to the protection device 3 must not be too slow in order to limit disturbance of the images captured by the at least one optical element or disturbance of the emission of optical signals in the case of a Lidar technology. However, this rotation speed must not be too high in order to prevent possible deformation of the wiper rubber 111, to prevent the latter from turning over, or to prevent premature fatigue of the latter or even rupture between the wiper rubber 111 and the heel piece 113.

According to one particular embodiment of the driving assistance system 1, the protection device 3 is configured to be mounted on and fixed to the motor vehicle and the wiper blade 11 is configured to be mounted to be mobile relative to the protection device 3. According to this particular embodiment, the actuator 9 is therefore configured to drive movement of the wiper blade 11. According to this particular embodiment, the actuator 9 is more particularly configured to move the arm to which the wiper blade 11 is attached via the fixing element 117 rotating about the axis of revolution A of the protection device 3.

According to an alternative driving assistance system 1, the wiper blade 11 is configured to be mounted on and fixed to the motor vehicle and the protection device 3 is configured to be mounted to be mobile relative to the wiper blade 11. According to this alternative, the actuator 9 is configured to drive the protection device 3 in rotation on itself about its axis of revolution A.

According to a further variant, the protection device 3 may be mobile in rotation about the axis of revolution A in a first direction and the wiper blade 11 may be mounted to be mobile in rotation about the axis of revolution A in a second direction opposite the first direction. According to this variant, the driving assistance system 1 includes two actuators 9, one being configured to produce the movement in the first direction and the other being configured to produce the movement in the second direction.

The driving assistance system 1 (shown in FIG. 1) may further include an electronic control unit (not shown here). The electronic control unit is configured to trigger a process 100 of cleaning the protection device 3. The electronic control unit may be connected to the at least one optical element, and possibly configured to enable detection of dirt on the at least one protection device 3.

Process 100 of Cleaning the Protection Device 3

Referring to FIG. 6, there is shown diagrammatically a diagram including the various steps executed during the process 100 of cleaning the protection device 3 using a cleaning module 10 as described above with reference to FIGS. 1 to 5C.

The process 100 of cleaning the protection device 3 includes at least one step E1 of supplying the cleaning liquid feed pipe 13 (FIGS. 2A to 4C and 5A to 5C) with cleaning liquid followed by a step E2 of spraying cleaning liquid onto the surface of revolution 5 of the protection device 3 (FIG. 1) and a step E3 of wiping the surface of revolution 5 by relative movement between the wiper blade 11 of the cleaning module 10 and the protection device 3.

According to one particular embodiment, the electronic control unit may be configured to control the inlet 133 of the cleaning liquid feed pipe 13 in order to control the flow rate of the cleaning liquid in the cleaning liquid feed pipe 13 during the step E1 of supplying the cleaning liquid feed pipe 13.

The process 100 of cleaning the protection device 3 may optionally include a step E0 of detecting the presence of dirt on the surface of revolution 5 of the protection device 3. This detection step E0 is executed before the supply step E1. The electronic control unit may be configured, if dirt is detected on the surface of revolution 5 of the protection device 3, to trigger the process 100 of cleaning the protection device 3 when the presence of dirt on the latter is detected by the optical element. According to an alternative, the electronic control unit may be configured to trigger the process 100 of cleaning the protection device 3 at the end of a predetermined time of use of the driving assistance system 1. In the case of this alternative, the detection step E0 is not necessary.

Moreover, and also optionally, the process 100 of cleaning the protection device 3 may include a step E4 of stopping the spraying of cleaning liquid to enable the detection of any dirt still present on the detection device 3. During this step E4 of stopping spraying liquid, the wiping step E3 may be continued so that the wiper rubber 111 wipes the surface of revolution 5 of the protection device 3 in order in particular to eliminate residual traces of cleaning liquid that may be present on that surface of revolution 5. The execution of this step E4 of stopping spraying liquid inter alia allows drying of the surface of revolution 5 of the protection device 3 so that the driving assistance system 1 returns quickly to good operation following cleaning the protection device 3.

Moreover, and still optionally, the process 100 of cleaning the protection device 3 may include a pause step E4' in which relative movement in rotation of the wiper blade 11 with respect to the protection device 3 and spraying cleaning liquid are stopped in order to allow the detection of the presence of any dirt on the protection device 3.

In order to limit the nuisance caused by cleaning the protection device 3, the electronic control unit may be configured so that the cleaning process 100, and more particularly the execution of the spraying step E2 and the wiping step E3, has a duration less than two minutes, and preferably less than 50 seconds.

Also, as shown in FIGS. 2B and 2C, the cleaning liquid pipe 13 is disposed on the wiper blade 11 so as to spray the cleaning liquid onto the surface of revolution 5 before the passage of the wiper rubber 111 during the wiping step E3. The cleaning liquid is therefore wiped shortly after it is sprayed onto the surface of revolution 5, which makes it possible to limit disturbance of the driving assistance system 1 when executing the process 100 for cleaning the protection device 3. The rotation speed may be adapted, and more particularly reduced, between two successive passages of the wiper blade 11 so that the cleaning liquid has for example more time to moisten the dirt should some dirt still be detected after cleaning 100 of the protection device 3.

Also, the process 100 of cleaning the protection device 3 may be triggered by the electronic control unit when the motor vehicle is stationary or moving.

The particular examples described hereinabove are provided by way of nonlimiting illustration. In fact, it is entirely possible for the person skilled in the art to dispose the fixing element 117 elsewhere on the wiper blade 11 without departing from the scope of the present invention. Also, the person skilled in the art could adapt the position of the inlet 133 of the cleaning liquid feed pipe 13, the cooperation of the latter with the wiper blade 11, or again the connection between the inlet 133 of that pipe and the main pipe 7 without departing from the scope of the present invention.

Thus the cleaning module 10 as described above enables effective cleaning of the protection device 3 of an optical element of a driving assistance system 1, having a surface of revolution 5 with a small radius of curvature. It is more particularly the wiping of the surface of revolution 5 by the wiper rubber 111 in conjunction with the spraying of cleaning liquid onto that surface of revolution 5 with a small spraying angle α that enables this effective cleaning of the protection device 3. Also, the disposition of the cleaning liquid feed pipe 13 enables the cleaning liquid to be sprayed as close as possible to the wiper rubber 111 which inter alia makes it possible to limit disturbance of the driving assistance system 1 during the process 100 of cleaning the protection device 3.

The invention claimed is:

1. A module for cleaning a protection device of an optical element configured to equip a motor vehicle, the protection device having a surface of revolution around an axis of revolution, the cleaning module comprising:
   a wiper blade configured to extend in a first general direction parallel to the axis of revolution of the protection device, the wiper blade including a wiper rubber configured to extend from the wiper blade toward the surface of revolution in a second general direction perpendicular to the first general direction of extension of the wiper blade:
   wherein the wiper rubber is configured to wipe the surface of revolution of the protection device during relative movement of rotation between the wiper blade and the protection device about the revolution axis; and
   a cleaning liquid feed pipe fixed to the wiper blade, said cleaning liquid feed pipe including a plurality of openings disposed in a row extending parallel to the wiper blade for spraying cleaning liquid disposed so as to define a direction of spraying the cleaning liquid forming an angle between 0° and 15° inclusive with the second general direction,
   wherein a first end and a second end of the cleaning liquid feed pipe are solid such that the cleaning liquid is prevented from exiting the first end and the second end of the cleaning liquid feed pipe.

2. The cleaning module according to claim 1, wherein the cleaning liquid feed pipe is fixed to the wiper blade on a side opposite the wiper rubber.

3. The cleaning module according to claim 1, wherein the wiper blade further includes at least one stiffener spine extending in the first general direction, said stiffener spine being disposed on the wiper blade on a side opposite the wiper rubber.

4. The cleaning module according to claim 1, further comprising at least two clipping means configured to connect the cleaning liquid feed pipe to the wiper blade.

5. The cleaning module according to claim 4, wherein the cleaning liquid feed pipe includes an inlet for supplying the cleaning liquid feed pipe with the cleaning liquid disposed at a first end of the cleaning liquid feed pipe.

6. The cleaning module according to claim 5, wherein the inlet of the cleaning liquid feed pipe is connected directly to a main pipe configured to supply the cleaning liquid feed pipe with the cleaning liquid.

7. The cleaning module according to claim 5, wherein:
   said module includes at least one first clipping means and one second clipping means disposed at the ends of the cleaning liquid feed pipe, and the first clipping means is disposed at the inlet of the cleaning liquid feed pipe and configured to make the connection between the inlet and a main pipe configured to supply the cleaning liquid feed pipe with the cleaning liquid.

8. The cleaning module according to claim 1, further comprising a first end cap and a second end cap disposed at longitudinal ends of the wiper blade.

9. The cleaning module according to claim 8, wherein an inlet of the cleaning liquid feed pipe cooperates with the first end cap, the first end cap being configured to make a connection between the inlet of the cleaning liquid feed pipe and a main pipe configured to supply the cleaning liquid feed pipe with cleaning liquid.

10. The cleaning module according to claim 1, wherein the cleaning liquid feed pipe includes an inlet for feeding the cleaning liquid feed pipe with cleaning liquid, said inlet being disposed in an offset manner relative to the first end and the second end of the cleaning liquid feed pipe.

11. A driving assistance system for a motor vehicle, comprising:
   at least one optical element;
   at least one device for protection of said at least one optical element having a surface of revolution about an axis of revolution;
   at least one module according to claim 1 for cleaning said at least one protection device; and
   at least one actuator configured to generate the relative movement of rotation between the protection device and the wiper blade of the cleaning module about the axis of revolution of the protection device.

12. The driving assistance system according to claim 11, wherein the protection device is configured to be mounted on and fixed to the motor vehicle and the wiper blade is configured to be mounted to be mobile relative to the protection device.

13. The driving assistance system according to claim 11, wherein the wiper blade is configured to be mounted on and fixed to the motor vehicle and the protection device is configured to be mounted to be mobile relative to the wiper blade.

14. The driving assistance system according to claim 11, further comprising an electronic control unit configured to control the cleaning of the protection device by the cleaning module.

* * * * *